(12) United States Patent
Green et al.

(10) Patent No.: US 7,258,641 B2
(45) Date of Patent: Aug. 21, 2007

(54) POWER DIVIDER LUBRICATION IN TANDEM DRIVE AXLES

(75) Inventors: Michael Green, Kalamazoo, MI (US);
Gary Turner, Three Rivers, MI (US);
Brad Cornell, Augusta, MI (US)

(73) Assignee: Dana Corporation, Toledo, OH (US)

( * ) Notice: Subject to any disclaimer, the term of this patent is extended or adjusted under 35 U.S.C. 154(b) by 193 days.

(21) Appl. No.: 11/198,997

(22) Filed: Aug. 8, 2005

(65) Prior Publication Data
US 2007/0032331 A1    Feb. 8, 2007

(51) Int. Cl.
*F16H 57/04* (2006.01)
(52) U.S. Cl. .................................... 475/160
(58) Field of Classification Search ............... 475/160, 475/221
See application file for complete search history.

(56) References Cited
U.S. PATENT DOCUMENTS

| | | | |
|---|---|---|---|
| 2,870,854 A | 1/1959 | Keese | |
| 3,383,937 A | 5/1968 | Toenne et al. | |
| 3,532,183 A * | 10/1970 | Shealy | 184/10 |
| 3,771,622 A | 11/1973 | Hyakumura | |
| 4,231,266 A | 11/1980 | Nishikawa et al. | |
| 4,612,818 A | 9/1986 | Hori et al. | |
| 5,404,963 A | 4/1995 | Crepas et al. | |

\* cited by examiner

*Primary Examiner*—Dirk Wright
(74) *Attorney, Agent, or Firm*—Dykema Gossett PLLC

(57) ABSTRACT

A drive axle assembly is provided that improves lubrication of the bearing surfaces of the inter-axle differential gears, the side gears meshed with the differential gears, and the input and output shafts. Lubricant splashed from the ring gear is collected and is then distributed by a bearing supporting the output side gear for rotation within the housing for the assembly. The bearing directs lubricant to the differential gears where seals and/or close tolerances retain the lubricant an allow it to flow to the surfaces of the input shaft and the helical side gear disposed about the input shaft. The output side gear disposed about the output shaft may also include a passage allowing lubricant to flow through the gear to the bearing surfaces of the output shaft and output side gear.

15 Claims, 3 Drawing Sheets

POWER DIVIDER LUBRICATION IN TANDEM DRIVE AXLES

FIELD OF THE INVENTION

This invention relates to a drive axle assembly and, in particular, to a lubrication system within the drive axle assembly. The present invention provides a flow through lubrication system wherein lubricant splashed by the ring gear is directed to the bearing surfaces of the inter-axle differential gears, the side gears meshed with the differential gears, and the input and output shafts extending through the side gears.

DISCLOSURE OF RELATED ART

A conventional tandem axle assembly includes forward and rear axle assemblies and an intermediate drive shaft assembly connecting the two axle assemblies. The forward and rear axle assemblies each include a pair of axle half shafts extending therefrom on which one or more wheels of a vehicle are mounted. Each of the forward and rear axle assemblies further includes a differential gear set that allows the vehicle wheels on each axle assembly to rotate at different speeds. Each of the differential gear sets includes a pinion gear in mesh with a ring gear (which in turn drives a plurality of bevel gears to cause rotation of the axle half shafts). The pinion gears of the forward and rear axle assemblies are driven by an inter-axle differential housed within the forward axle assembly (with the rear axle assembly being driven by the inter-axle differential through the intermediate drive shaft assembly).

The inter-axle differential for a conventional tandem axle assembly includes a spider mounted on an input shaft extending into a housing of the forward axle assembly. The spider supports a plurality of bevel pinion gears. The differential further includes a pair of side gears in mesh with, and driven by, the pinion bevel gears. One side gear is used to drive the pinion gear of the forward axle assembly wheel differential. The other side gear is coupled to an output shaft that extends outwardly from the forward axle assembly housing and drives the intermediate drive shaft assembly.

There is a need to provide lubrication to the bearing surfaces of the inter-axle differential gears, as well as the side gears meshed with the differential gears and the input and output shafts. One conventional method of lubricating the inter-axle differential gears and other bearing surfaces is to rely on splash lubrication from the side gear disposed about the input shaft. The close tolerances between the inter-axle differential, side gears and related components, however, limit the amount of lubricant that is delivered to the differential using this method of lubrication. Another conventional method of lubricating these bearing surfaces is to drill passages through the input shaft and a thrust washer thereby allowing lubricant to flow to various bearing surfaces. This method, however, is relatively expensive.

The inventors herein have recognized a need for a drive axle assembly that will minimize and/or eliminate one or more of the above-mentioned deficiencies.

SUMMARY OF THE INVENTION

The present invention relates to a drive axle assembly for a vehicle.

A drive axle assembly in accordance with one aspect of the present invention includes a housing and an input shaft extending into the housing and disposed about an axis of rotation. The assembly also includes a plurality of differential gears drivingly coupled to the input shaft. A first side gear is disposed about the input shaft and the axis of rotation on one side of the plurality of differential gears. The first side gear is drivingly coupled to the plurality of differential gears and is configured to provide power to a first wheel differential, the first wheel differential including a ring gear. A second side gear is disposed about the input shaft and the axis of rotation on another side of the plurality of differential gears. The second side gear is drivingly coupled to the plurality of differential gears and to an output shaft. A bearing is disposed about the second side gear and supports the second side gear for rotation within the housing. The bearing directs lubricant splashed by the ring gear to the plurality of differential gears.

A drive axle assembly in accordance with another aspect of the present invention includes an input shaft disposed about an axis of rotation and a plurality of differential gears drivingly coupled to the input shaft. A first side gear is disposed about the input shaft and the axis of rotation on one side of the plurality of differential gears. The first side gear is drivingly coupled to the plurality of differential gears and configured to provide power to a first wheel differential, the first wheel differential including a ring gear. A second side gear is disposed about the input shaft and the axis of rotation on another side of the plurality of differential gears. The second side gear is drivingly coupled to the plurality of differential gears and to an output shaft. The second side gear defines a passage having an inlet on a radially outer surface of the second side gear and an outlet on a radially inner surface of the second side gear. Lubricant splashed by the ring gear flows through the passage to lubricate a surface of the input shaft and a radially inner surface of the second side gear.

A drive axle assembly in accordance with the present invention is advantageous as compared to conventional drive axle assemblies. The inventive drive axle assembly provides lubricant splashed by the ring gear to various bearing surfaces including the inter-axle differential gears and the bearing surfaces between the side gears and the input shaft. In this manner, increased amounts of lubricant are provided to these surfaces and in a manner that is less expensive than in conventional drive axle assemblies.

These and other advantages of this invention will become apparent to one skilled in the art from the following detailed description and the accompanying drawings illustrating features of this invention by way of example.

DETAILED DESCRIPTION OF EMBODIMENTS OF THE INVENTION

Figure 1:
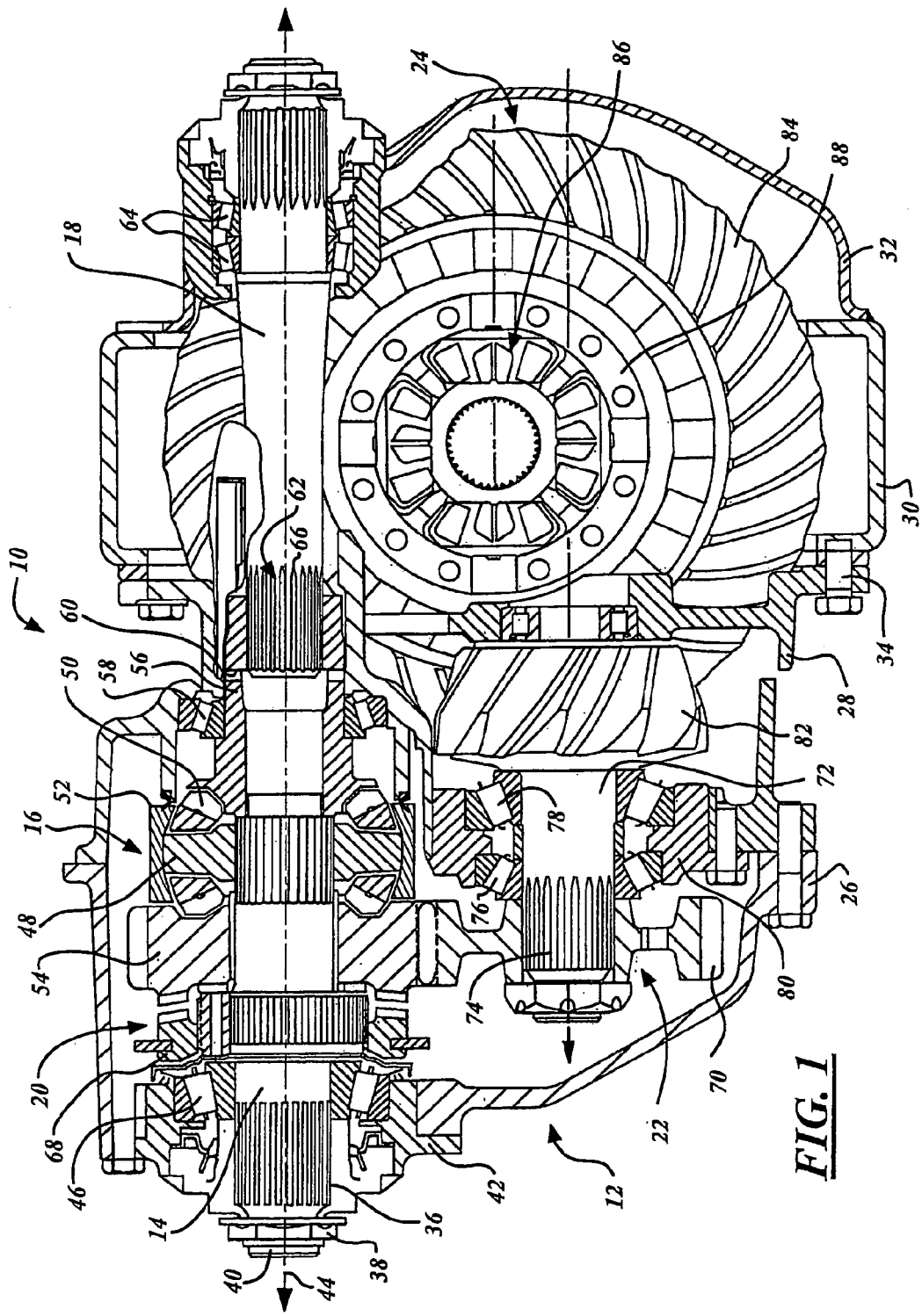
FIG. 1 is a cross-sectional view of one embodiment of a drive axle assembly in accordance with the present invention.

Referring now to the drawings wherein like reference numerals are used to identify identical components in the various views, FIG. 1 illustrates a drive axle assembly 10.

Assembly 10 may comprise the forward drive axle assembly of a tandem drive axle assembly and may be connected to a rear drive axle assembly (not shown) through an intermediate drive shaft assembly (not shown). Assembly 10 is provided to drive wheels (not shown) supported on either side of assembly 10 on axle half shafts (not shown) extending from assembly 10. Assembly 10 is particularly adapted for use in heavy trucks. It should be understood, however, that the present invention is not limited to use in heavy trucks and may be used in a wide variety of vehicles. Assembly 10 may include a housing 12, an input shaft 14, an inter-axle differential 16, an output shaft 18, a differential locking device such as clutch 20, a pinion shaft assembly 22 and a wheel differential 24.

Housing 12 provides structural support for the other components of assembly 10. Housing 12 also protects the other components of assembly 10 from foreign objects and elements. Housing 12 may be made from conventional metals and metal alloys such as steel and may include multiple members 26, 28, 30, and 32 that are sized relative to components of assembly 10 and coupled together using conventional fasteners 34.

Input shaft 14 transmits power from the vehicle drive shaft assembly (not shown) to inter-axle differential 16. Shaft 14 may be made from conventional metals and metal alloys. Shaft 14 is driven by the vehicle drive shaft (not shown) through a conventional input yoke (not shown). The input yoke may be splined to the forward end of input shaft 14 on splines 36 and may be retained thereon by a nut 38 and a washer which are disposed about a threaded stud 40 that extends from the forward end of shaft 14 and is integral therewith. A cover 42 is disposed about shaft 14 and is received within an opening in housing member 26. Shaft 14 is journalled for rotation about an axis of rotation 44 within an opening in cover 42 by bearings 46 disposed within the opening.

Differential 16 is provided to divide power between assembly 10 and another drive axle assembly. Differential 16 may include a spider 48, a plurality of differential gears 50, a differential gear case 52 and side gears 54, 56.

Spider 48 provides a mounting arrangement for differential gears 50 and is conventional in the art. Spider 48 may be coupled to input shaft 14 for rotation therewith using a spline connection or in other ways customary in the art. Alternatively, spider 48 may be made integral with input shaft 14.

Gears 50 are provided to divide and transfer torque from input shaft 14 to side gears 54, 56. Gears 50 are conventional in the art and may be made from conventional metals and metal alloys. Gears 50 are mounted on spider 48 for rotation with spider 48 and input shaft 14. The teeth on gears 50 engage corresponding teeth on side gears 54, 56.

Case 52 is provided to house gears 50 and to retain gears 50 on spider 48. Case 52 is conventional in the art and includes a concave inner surface sized to receive gears 50. The arms of spider 48 may extend into and/or through bores defined in case 52.

Side gear 54 transfers torque from gears 50 to pinion shaft assembly 22. Gear 54 is also conventional in the art and may be made from conventional metals and metal alloys. Gear 54 is disposed about input shaft 14 and is freely rotatable thereon, being journalled on shaft 14 by bearings (not shown). Gear 54 includes a first set of teeth on a forward planar surface which forms a first member of clutch 20 and a second set of teeth disposed on a rear planar surface that engage the teeth of differential gears 50. Gear 54 further includes a third set of teeth disposed about the radial periphery of gear 54 for engagement with pinion shaft assembly 22.

Gear 56 transmits power from differential gears 50 to output shaft 18. Gear 56 is also conventional in the art and may be made from conventional metals and metal alloys. Gear 56 is disposed about shaft 18 and may be coupled thereto by mating splines (not shown) on gear 56 and shaft 18. Gear 56 is journalled for rotation within housing member 28 by a bearing 58. In accordance with one aspect of the present invention, gear 56 defines a passage 60 having an inlet on a radially outer surface of gear 56 and an outlet on a radially inner surface of gear 56. Passage 60 may be located rearwardly of bearing 58. Passage 60 extends radially through gear 56 in the illustrated embodiment. It should be understood, however, that passage 60 may be routed differently without departing from the spirit of the present invention.

Output shaft 18 is provided to transmit a portion of the power provided by input shaft 14 to the rear drive axle assembly (not shown) through an intermediate drive shaft assembly (not shown). Shaft 18 is conventional in the art. Shaft 18 is coaxially disposed relative to input shaft 14 along axis 44 and includes a pilot portion 62 at its forward end on which input shaft 14 is journalled. Shaft 18 extends through openings in housing members 28, 30, 32, respectively, and is journalled within an opening of housing member 32 by bearings 64. Shaft 18 is drivingly coupled to side gear 56 through interconnecting splines 66 proximate a forward end of shaft 18.

Clutch 20 is provided to selectively lock differential 16 and is conventional in the art. In the illustrated embodiment, clutch 20 comprises a conventional sliding dog clutch that may be engaged by shifting a clutch member 68 with a first set of teeth into engagement with a clutch member (gear 54 in the illustrated embodiment) having a second set of teeth using a shifting fork (not shown).

Pinion shaft assembly 22 transfers power from side gear 54 to wheel differential 24. Assembly 22 may include a helical driven gear 70 that is in engagement with side gear 54 and which transfers torque to a pinion shaft 72. Gear 70 may be drivingly coupled to shaft 72 through axially extending splines 74 on shaft 72. Shaft 72 may be rotationally supported by bearings 76, 78 within a bearing cage 80 affixed to housing member 28 and includes a pinion gear 82 at a rearward end.

Wheel differential 24 is provided to allow the wheels supported on either side of axle assembly 10 to rotate at different speeds. Assembly 24 includes a ring gear 84, and a conventional bevel gear set 86 disposed within a differential carrier 88. Ring gear 84 transfers torque from pinion gear 82 to gear set 86 and is conventional in the art. Ring gear 84 may be made from conventional metals and metal alloys and may comprise a hypoid gear. Gear 84 is affixed to carrier 88 or may be integral therewith. Gear set 86 is provided to transfer torque from ring gear 84 to the axle half shafts (not shown) supporting the vehicle wheels and is conventional in the art.

Figure 2:
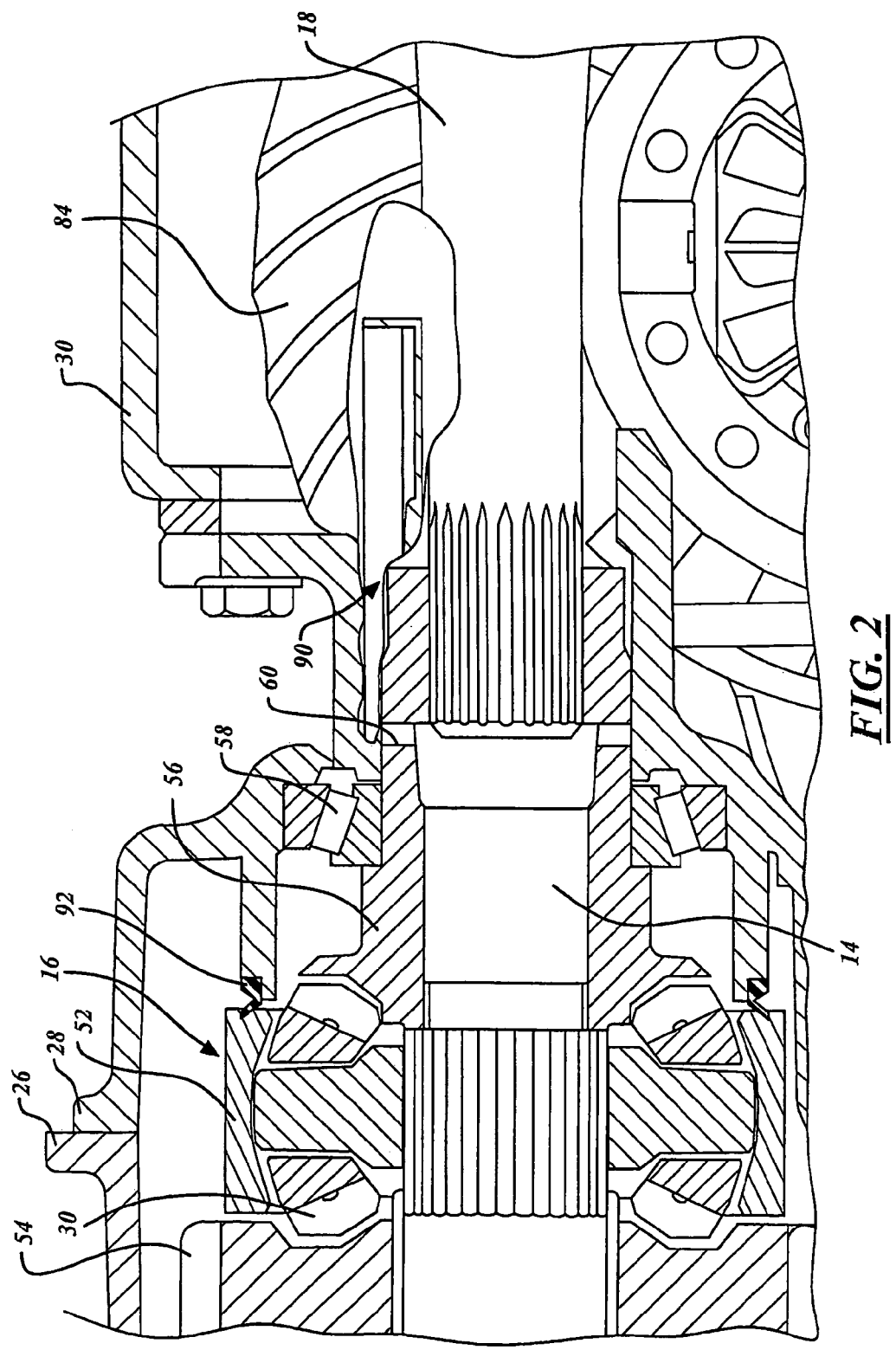
FIG. 2 is an enlarged, cross sectional view of a portion of the drive axle assembly of FIG. 1.

Referring now to FIG. 2, the lubrication system for assembly 10 will be described in greater detail. Assembly 10 may include a trough 90 which may be formed into housing 12 or attached as a separate component of housing 12. Trough 90 collects and distributes lubricant splashed from ring gear 84 upon rotation of ring gear 84 within assembly 10 and through a reservoir of lubricant formed in the bottom of housing 12. In accordance with one aspect of the present invention, this lubricant flows through passage 60 in side gear 56 to lubricate the bearing surfaces of side gear 56 and input shaft 14. As compared to conventional lubrication systems that result on lubricant splash from side gear 54 to lubricate this interface, the inventive system provides increase lubrication of the interface.

Figure 3:
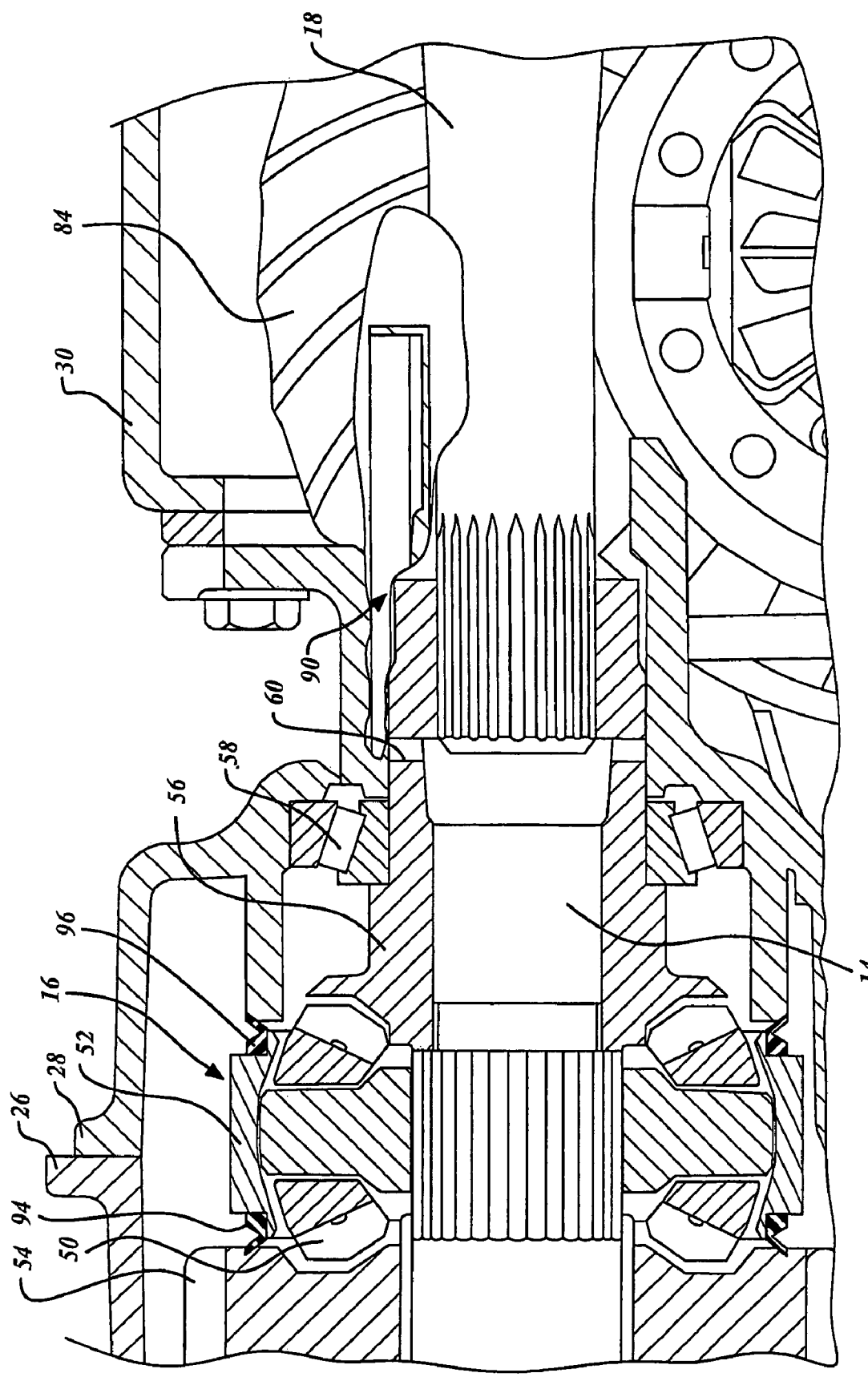
FIG. 3 is an enlarged, cross-sectional view of a portion of a drive axle assembly in accordance with another embodiment of the present invention.

In accordance with another aspect of the present invention, bearing 58 is both lubricated by the lubricant splash from ring gear 84 and acts as a pump to direct lubricant from trough 90 to differential 16. Lubricant passing through bearing 58 is provided to the differential gears 50 and side gears 54, 56. Further, lubricant flows along input shaft 14 to the bearing surfaces between shaft 14 and side gear 54. In this manner, the inventive system provides increased lubrication to differential 16 and related bearing surfaces in a relatively inexpensive manner. Lubricant is retained within differential 16 by an annular seal 92 disposed between housing 12 and case 50. Seal 92 may comprise a v-ring seal supported on a shoulder formed in housing 12 and disposed against case 50. Seal 92 may be made of various materials including rubber, plastic, synthetic materials, or other materials known in the art. The close tolerances between case 50 and side gear 54 limit the amount of lubricant that can flow between the case 50 and side gear 54 thereby causing most of the lubricant to flow through the bearing surfaces of the input shaft 14 and side gear 54. Referring to FIG. 3, however, in an alternate embodiment of the invention, seals 94, 96 may be disposed on either side of case 50 between case 50 and side gear 54 and between case 50 and housing 12. In this embodiment, each seal 94, 96 may comprise a v-ring seal and each seal may be supported on a shoulder formed in case 50. The seals 94, 96 are disposed against ring 54 and housing 12, respectively. Seals 94, 96 may again be made of various materials including rubber, plastic, synthetic materials, or other materials known in the art.

While the invention has been particularly shown and described with reference to the preferred embodiments thereof, it is well understood by those skilled in the art that various changes and modifications can be made in the invention without departing from the spirit and scope of the invention.

We claim:

1. A drive axle assembly, comprising:
   a housing;
   an input shaft extending into said housing and disposed about an axis of rotation;
   a plurality of differential gears drivingly coupled to said input shaft;
   a first side gear disposed about said input shaft and said axis of rotation on one side of said plurality of differential gears, said first side gear drivingly coupled to said plurality of differential gears and configured to provide power to a first wheel differential, said first wheel differential including a ring gear; and,
   a second side gear disposed about said input shaft and said axis of rotation on another side of said plurality of differential gears, said second side gear drivingly coupled to said plurality of differential gears and to an output shaft;
   a bearing disposed about said second side gear and supporting said second side gear for rotation within said housing
   wherein said bearing directs lubricant splashed by said ring gear to said plurality of differential gears.

2. The drive axle assembly of claim 1, further comprising:
   a case disposed about said plurality of differential gears; and,
   a first seal disposed between said case and said housing.

3. The drive axle assembly of claim 2 wherein said first seal comprises a v-ring seal.

4. The drive axle assembly of claim 2, further comprising a second seal disposed between said case and said first side gear.

5. The drive axle assembly of claim 4 wherein said second seal comprises a v-ring seal.

6. The drive axle assembly of claim 1, further comprising:
   a case disposed about said plurality of differential gears; and,
   a seal disposed between said case and said first side gear.

7. The drive axle assembly of claim 6 wherein said seal comprises a v-ring seal.

8. The drive axle assembly of claim 1 wherein said second side gear defines a passage having an inlet on a radially outer surface of said second side gear and a outlet on a radially inner surface of said second side gear and lubricant splashed by said ring gear flows through said passage to lubricate a surface of said input shaft and said radially inner surface of said second side gear.

9. The drive axle assembly of claim 8 wherein said inlet is disposed rearwardly of said bearing.

10. The drive axle assembly of claim 8 wherein said passage extends radially.

11. The drive axle assembly of claim 1, further comprising a trough in which lubricant splashed by said ring gear is collected and directed towards said bearing.

12. A drive axle assembly, comprising:
    a housing;
    an input shaft extending into said housing and disposed about an axis of rotation;
    a plurality of differential gears drivingly coupled to said input shaft;
    a first side gear disposed about said input shaft and said axis of rotation on one side of said plurality of differential gears, said first side gear drivingly coupled to said plurality of differential gears and configured to provide power to a first wheel differential, said first wheel differential including a ring gear; and,
    a second side gear disposed about said input shaft and said axis of rotation on another side of said plurality of differential gears, said second side gear drivingly coupled to said plurality of differential gears and to an output shaft; said second side gear defining a passage having an inlet on a radially outer surface of said second side gear and an outlet on a radially inner surface of said second side gear
    wherein lubricant splashed by said ring gear flows through said passage to lubricate a surface of said input shaft and a radially inner surface of said second side gear.

13. The drive axle assembly of claim 12, further comprising a bearing supporting said second side gear for rotation within said housing, said inlet disposed rearwardly of said bearing.

14. The drive axle assembly of claim 12 wherein said passage extends radially.

15. The drive axle assembly of claim 12, further comprising a trough in which lubricant splashed by said ring gear is collected and directed towards said inlet.

* * * * *